United States Patent
Rambler et al.

(10) Patent No.: US 10,825,123 B2
(45) Date of Patent: Nov. 3, 2020

(54) WATERMARKED ENABLED SCANNING

(71) Applicant: NCR Corporation, Duluth, GA (US)

(72) Inventors: Mark Allen Rambler, Decatur, GA (US); Steven Joel Hammer, Lilburn, GA (US)

(73) Assignee: NCR Corporation, Atlanta, GA (US)

( * ) Notice: Subject to any disclaimer, the term of this patent is extended or adjusted under 35 U.S.C. 154(b) by 642 days.

(21) Appl. No.: 14/954,533

(22) Filed: Nov. 30, 2015

(65) Prior Publication Data
US 2017/0154398 A1  Jun. 1, 2017

(51) Int. Cl.
| | | |
|---|---|---|
| *G06T 1/00* | (2006.01) |
| *G07D 7/005* | (2016.01) |
| *G07D 7/00* | (2016.01) |
| *G07D 7/12* | (2016.01) |
| *G06Q 20/20* | (2012.01) |
| *H04N 9/07* | (2006.01) |
| *G07D 7/1205* | (2016.01) |

(52) U.S. Cl.
CPC ......... *G06T 1/0021* (2013.01); *G06Q 20/208* (2013.01); *G07D 7/005* (2017.05); *G07D 7/0034* (2017.05); *G07D 7/12* (2013.01); *H04N 9/07* (2013.01); *G07D 7/1205* (2017.05)

(58) Field of Classification Search
CPC ........ H04N 21/24; H04N 5/765; H04N 15/00; H04N 1/44; G06K 9/78; G06K 9/36
USPC ........... 382/100, 232, 181; 348/46, E15.001; 396/311, 429
See application file for complete search history.

(56) References Cited

U.S. PATENT DOCUMENTS

| | | | |
|---|---|---|---|
| 6,069,696 A * | 5/2000 | McQueen | G01G 19/4144 235/383 |
| 6,345,104 B1 | 2/2002 | Rhoads | |
| 6,496,655 B1 * | 12/2002 | Malloy Desormeaux | G03B 17/48 348/64 |
| 6,501,911 B1 * | 12/2002 | Malloy Desormeaux | H04N 1/00132 348/64 |
| 6,522,771 B2 | 2/2003 | Rhoads | |
| 6,724,912 B1 | 4/2004 | Carr et al. | |
| 6,750,985 B2 | 6/2004 | Rhoads | |
| 6,804,379 B2 | 10/2004 | Rhoads | |
| 6,959,100 B2 | 10/2005 | Rhoads | |
| 7,130,087 B2 | 10/2006 | Rhoads | |
| 7,418,111 B2 | 8/2008 | Rhoads | |
| 7,720,255 B2 | 5/2010 | Rhoads | |
| 8,036,419 B2 * | 10/2011 | Rhoads | G06T 1/0028 382/100 |

(Continued)

FOREIGN PATENT DOCUMENTS

| | | |
|---|---|---|
| CN | 1631030 (A) | 6/2005 |
| WO | 2010/115879 A2 | 10/2010 |

OTHER PUBLICATIONS

European Search Report issued in European Patent Application EP16184082 dated Apr. 24, 2017.
EP Examination Report—dated Nov. 27, 2018.

*Primary Examiner* — Olusegun Goyea
(74) *Attorney, Agent, or Firm* — Schwegman, Lundberg & Woessner (57) ABSTRACT

A scanner camera having a filter for filtering out a predefined wavelength is provided. The predefined wavelength associated with product packaging watermarks that is read by the scanner camera using the filter.

15 Claims, 5 Drawing Sheets

(56) References Cited

U.S. PATENT DOCUMENTS

| | | | |
|---|---|---|---|
| 8,064,100 B2* | 11/2011 | Braun | H04N 1/32352 |
| | | | 358/1.9 |
| 8,165,341 B2 | 4/2012 | Rhoads | |
| 8,505,108 B2 | 8/2013 | Rhoads | |
| 8,620,772 B2* | 12/2013 | Owen | G06K 7/1443 |
| | | | 705/26.9 |
| 8,788,971 B2 | 7/2014 | Rhoads | |
| 8,867,782 B2* | 10/2014 | Kurtz | B42D 25/382 |
| | | | 382/100 |
| 9,058,388 B2* | 6/2015 | Rodriguez | G06F 16/9535 |
| 9,129,277 B2* | 9/2015 | MacIntosh | G06T 7/0004 |
| 9,600,982 B2* | 3/2017 | MacIntosh | G07G 1/06 |
| 2004/0001150 A1* | 1/2004 | Schindler, II | H04N 1/2116 |
| | | | 348/220.1 |
| 2004/0022444 A1* | 2/2004 | Rhoads | G06K 9/222 |
| | | | 382/232 |
| 2004/0201742 A1* | 10/2004 | Malloy Desormeaux | |
| | | | H04N 1/00132 |
| | | | 348/231.6 |
| 2006/0021104 A1 | 2/2006 | Green | |
| 2006/0211044 A1* | 9/2006 | Green | B01J 19/0046 |
| | | | 435/7.1 |
| 2010/0289877 A1* | 11/2010 | Lanfranchi | G02B 30/34 |
| | | | 348/46 |
| 2012/0311623 A1* | 12/2012 | Davis | H04N 5/765 |
| | | | 725/18 |
| 2013/0223673 A1* | 8/2013 | Davis | G06Q 30/00 |
| | | | 382/100 |
| 2014/0052555 A1* | 2/2014 | MacIntosh | G06K 9/00664 |
| | | | 705/23 |
| 2015/0310601 A1* | 10/2015 | Rodriguez | G07G 1/0072 |
| | | | 348/150 |

* cited by examiner

WATERMARKED ENABLED SCANNING

BACKGROUND

Point-Of-Sale (POS) devices often include a variety of integrated devices, such as scanners, scales, integrated scanners with scales, card readers with on-screen signature capabilities, and the like.

Some scanners come equipped with both a laser and a camera. Here, a camera is added to the laser scanner so that more types of barcodes can be read and processed. Generally, the laser operates to detect a one-dimensional bar code that is moved across its line of sight. These composite scanners have a variety of buttons and options that the cashier or a service engineer can access for purposes of configuring the scanners and/or adjusting settings on the scanners. This is a cumbersome process and requires the cashier to know what buttons to press on the scanner and in what order or sequence to achieve a desired setting. In addition, POS devices with both a laser and a camera are more expensive.

In fact, imaging scanners have advantages over laser scanners in that they can read two-dimensional (2D) symbols and are actually better at detecting some poor quality one-dimensional (1D) tags. However, to date imaging scanners are still relatively expensive when compared to laser scanners. This is largely due to the fact that scanners with cameras require multiple cameras (more than one) in order to view multiple sides of an object being scanned, which is a requirement for bioptic scanning.

However, recent watermarking techniques with packaging have made the need for multiple cameras less necessary. This is so because the barcode and other information can be watermarked into the entire product packaging, which may or may not have the original product barcode. The watermark is hidden from view. One issue with the watermark is that color is used to integrate dots throughout the packaging, such that the ability for a monochrome-scanner camera is heavily dependent on the light that is illuminating the colored dot patterns used for watermarking the product information.

For example, Digimarc® is a popular product packaging watermarking technology. Digimarc® mostly relies on red colored dots integrated into the packaging as product information. However, a color scanner (or only red illumination if using a monochrome imager) is generally needed for recognizing the Digimarc® watermarks in a product's packaging. Most companies do not have a color imager in their scanner and upgrading to one can be expensive when companies can have tens or hundreds of thousands of scanners deployed throughout their retail stores.

SUMMARY

In various embodiments, watermarked enabled scanning is provided for a monochrome camera scanner.

According to an embodiment, a method for watermarked enabled scanning is provided.

Specifically, an image of a product is received through a filter. Next, a watermark is identified from the image based on the filtered image, and the watermark is associated with product information for the product.

DETAILED DESCRIPTION

Figure 1A:
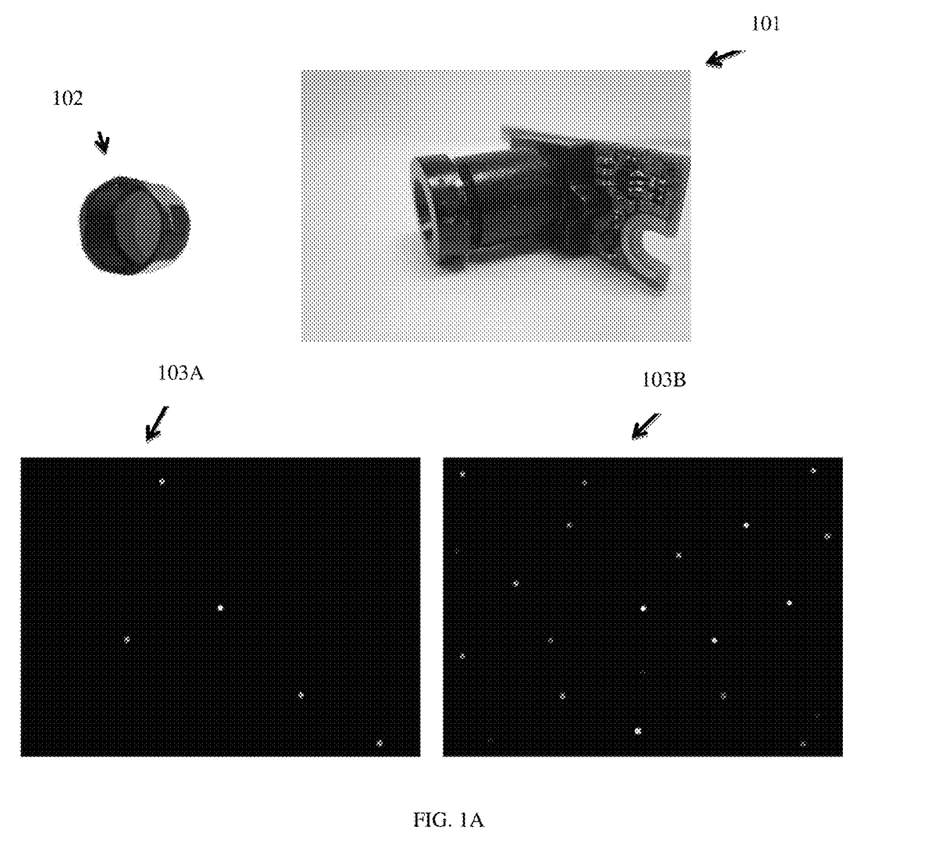
FIG. 1A is a diagram depicting a monochrome scanner camera with filter and example diagrams depicting views of watermarked patterns detected by the monochrome scanner camera, according to an example embodiment.

FIG. 1A is a diagram depicting a monochrome scanner camera with filter and example diagrams depicting views of watermarked patterns detected by the monochrome scanner camera, according to an example embodiment. It is to be noted that the configuration is shown schematically in greatly simplified form, with only those components relevant to understanding of this embodiment being illustrated.

The camera 101 is equipped with a filter 102 that enables the scanner camera 101 to distinguish between specific colors or wavelengths associated with specific colors.

For example, the two images 103A and 103B illustrate what the scanner camera 101 recognizes from imaging a watermarked package of a product. 103B shows color dots of various colors and wavelengths as imaged by the scanner camera 101 without the novel filter 102 being deployed. 103A shows the 5 specific dots detected and imaged by the scanner camera from a watermarked package of the product when the novel filter 102 is being deployed. These 5 specific dots are associated with a specific color wavelength.

In an embodiment, the filter 102 is a long pass filter that detects wavelengths above approximately 500 nanometers.

In an embodiment, the filter 102 is a long pass filter that detects wavelengths above approximately 590 nanometers.

In an embodiment, the filters 102 is a filter designed to capture Digimarc® watermarks that are primarily associated with red color or red color wavelengths.

In an embodiment, the scanner camera 101 uses broadband light for illumination, this allows the imaging sensor to extract data from all colors (intended to be depicted in 103B although greyscale is shown), but not just a single color (for example red). Thus, the broadband light causes a problem when only one spectrum of light is trying to be distinguished or uniquely imaged by the scanner camera 101 for identification (such as when watermarks are being used to replace product information or augment product information). For example, if a cyan, yellow, and magenta dots are all printed next to each other with the same intensity on a product packaging of a product, then the scanner camera 101 will only see one color of grey and will not be able to distinguish between the 3 different colors (the image from the scanner camera 101 will show up as 3 grey dots). Therefore, a watermark algorithm to recognize a pattern of dots or watermarks will fail when just one of the 3 unique colors are relevant to the watermark (such as is the case with Digimarc® that employs red dot patterns).

However, when the filter 102 is employed and situated over the lens of the scanner camera 101, then specific color(s) or wavelengths of reflective light that the filter is designed to detect can be imaged and properly processed by a watermark algorithm (such as Digimarc® watermark algorithm). Thus, only one specific and desired color and its associated pattern is imaged as shown in 103A when the filter 102 is used with the scanner camera 101.

Figure 1B:
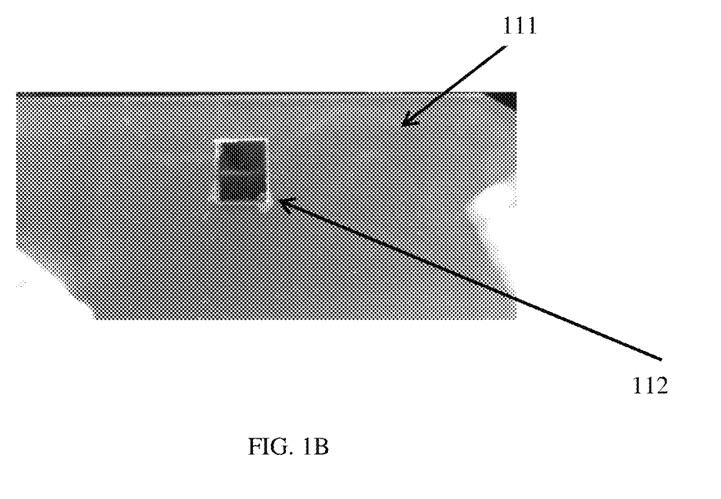
FIG. 1B is a diagram illustrating a filter on a clear slide for providing watermarked enabled scanning, according to an example embodiment.

FIG. 1B is a diagram illustrating a filter 112 on a clear slide 111 for providing watermarked enabled scanning, according to an example embodiment.

In an embodiment, the filter 112 is red for filtering red light. The filter 112 is a red transmissive material that only allows red light to pass through it. So, when the filter 112 is placed in front of the imaging sensor of the scanner camera 101 of the FIG. 1A in the cyan, yellow, and magenta example presented above, only the magenta (reddish) light is reflected back and will pass through the filter 112, the rest of the light (yellow and cyan) will not transmit through the filter 112 (and so appear dark). So, as shown in 103A the scanner camera 101 produces a monochrome image with grey dots representing just (only) the red dots present in the product packaging.

Again, this is particularly useful for Digimarc® watermarking where red colored dot patterns are used to integrate barcode and/or Universal Product Code (UPC) information for a product throughout the entire packaging of the product. So, rather than having to deploy color-based scanners, existing monochrome scanners can be retrofitted with a filter 102 and/or 112 and such monochrome scanners can be enabled to process specific wavelengths or color-based watermarking schemes (such as the Digimarc® watermark scheme).

In an embodiment, a kit can be supplied that instructs retailers how to place and install the filters 102 on their existing scanner cameras 101.

In an embodiment, newly manufactured monochrome scanner cameras 101 are manufactured with the filters 102.

These and other embodiments are now discussed with reference to the FIGS. 2-4.

Figure 2:
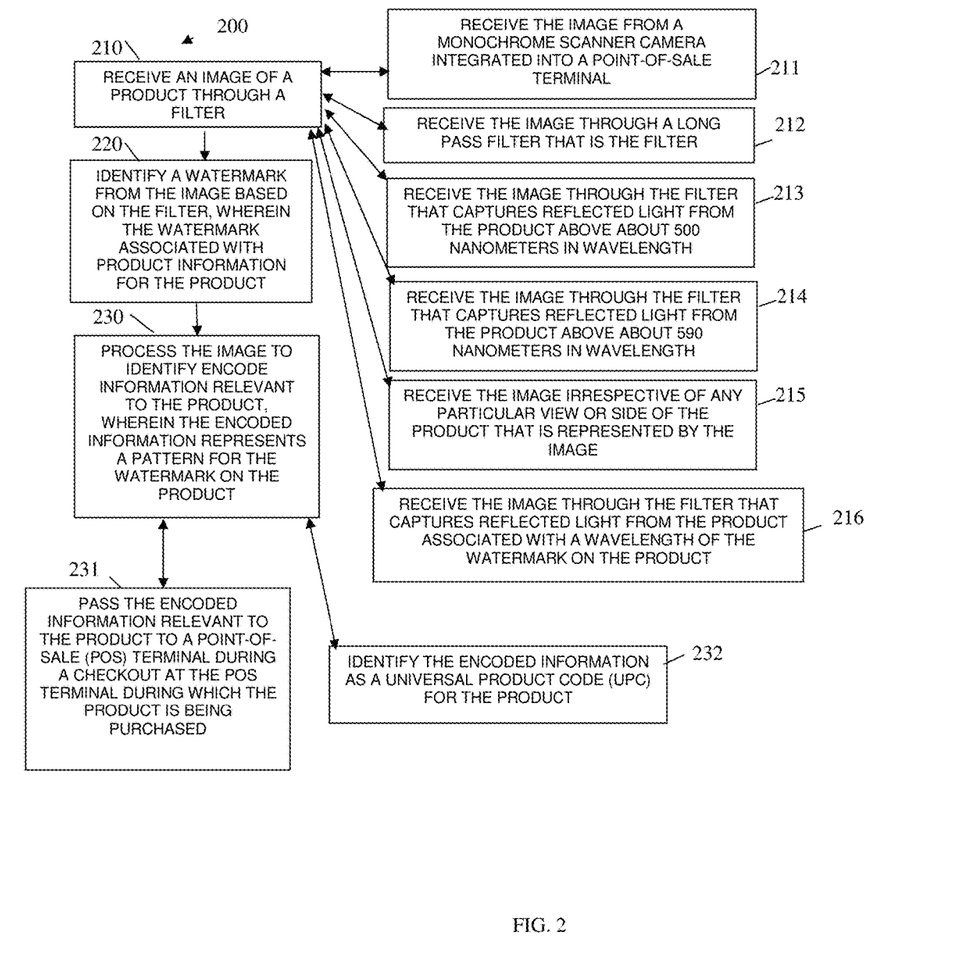
FIG. 2 is a diagram of a method for scanning watermarked information using a monochrome scanner camera, according to an example embodiment.

FIG. 2 is a diagram of a method 200 for scanning watermarked information using a monochrome scanner camera, according to an example embodiment. Some portions of the method 200 may be implemented as software module(s). The method is herein referred to as the "watermark filter controller." Any software portions of the watermark filter controller is implemented as executable instructions programmed and residing within memory and/or a non-transitory computer-readable (processor-readable) storage medium and executed by one or more processors of a device associated with a scanner. The processor(s) of the device that executes any software modules of the watermark filter controller are specifically configured and programmed to process those software portions of the watermark filter controller. Any software portions associated with the watermark filter controller may, but does not have to have, access to a network during its processing. The network can be wired, wireless, or a combination of wired and wireless.

In an embodiment, the scanner is the scanner camera 101 of the FIG. 1A.

In an embodiment, the scanner is a monochrome scanner camera.

In an embodiment, the filter is a long pass filter.

In an embodiment, the filter filters light transmitting above approximately 500 nanometers.

In an embodiment, the filter filters light transmitting above approximately 590 nanometers.

In an embodiment, the filter is the filter 102 of the FIG. 1A.

In an embodiment, the filter is the filter 112 of the FIG. 1B.

In an embodiment, the filter is a Digimarc® enabled watermark filter for permitting the scanner to image just Digimarc® watermarked wavelengths.

At 210, the watermark filter controller receives an image of a product through a filter. That is, the camera captures any field of view of the product that is placed in front of the camera and images that field of view through the camera lens.

In an embodiment, at 211, the watermark filter controller receives the image from a monochrome scanner camera that is integrated into or interfaced to a Point-Of-Sale (POS) terminal during a checkout process during which the product is being purchased by a consumer.

In an embodiment, at 212, the watermark filter controller receives the image through a long pass filter that is the filter. That is reflective light from the product is filtered by the long pass filter so that just or only long wavelengths are captured as part of the image.

In an embodiment, at 213, the watermark filter controller receives the image through the filter that captures reflected light from the product above, at, or about 500 nanometers in wavelength.

In an embodiment, at 214, the watermark filter controller receive the image through the filter that captures reflected light from the product above, at, or about 590 nanometers.

In an embodiment, at 215, the watermark filter controller receives the image irrespective of any particular view or side of the product when presented at the scanner camera; the image being a digital representation of the product at the captured view or side. So, the placement of the product in front of the scanner camera is of no particular import.

In an embodiment, at 216, the watermark filter controller receives the image through the filter that captures reflected light from the product associated with a wavelength of the watermark on the product. That is, whatever wavelength that the watermark reflects as when exposed to a light source, the filter is designed to capture that particular wavelength.

In embodiment, the watermark filter controller dynamically adjusts based on a setting to permit more or less reflected light to be imaged from the product.

At 220, the watermark filter controller identifies the watermark from the image based on the filter. The watermark is associated with product information for the product. That is, the watermark represents a series of dots in a predefined pattern that is exposed in the image through the filter and that predefined pattern uniquely identifies product information for the product.

In an embodiment, at 230, the watermark filter controller processes the image to identify encoded information relevant to the product. The encoded information represents a predefined pattern for the watermark on the product.

In an embodiment of 230 and at 231, the watermark filter controller passes the encoded information relevant to the product to a POS terminal during a checkout at the POS during which the product is being purchased by a consumer at a retail store.

In an embodiment of 230 and at 232, the watermark filter controller identifies the encoded information as a Universal Product Code (UPC) for the product. This can include information that would be present in a traditional barcode affixed to the product. Although it is to be noted, that in other embodiments any type of product encoding may be captured, such that UPC encoding is but one embodiment presented herein.

Figure 3:
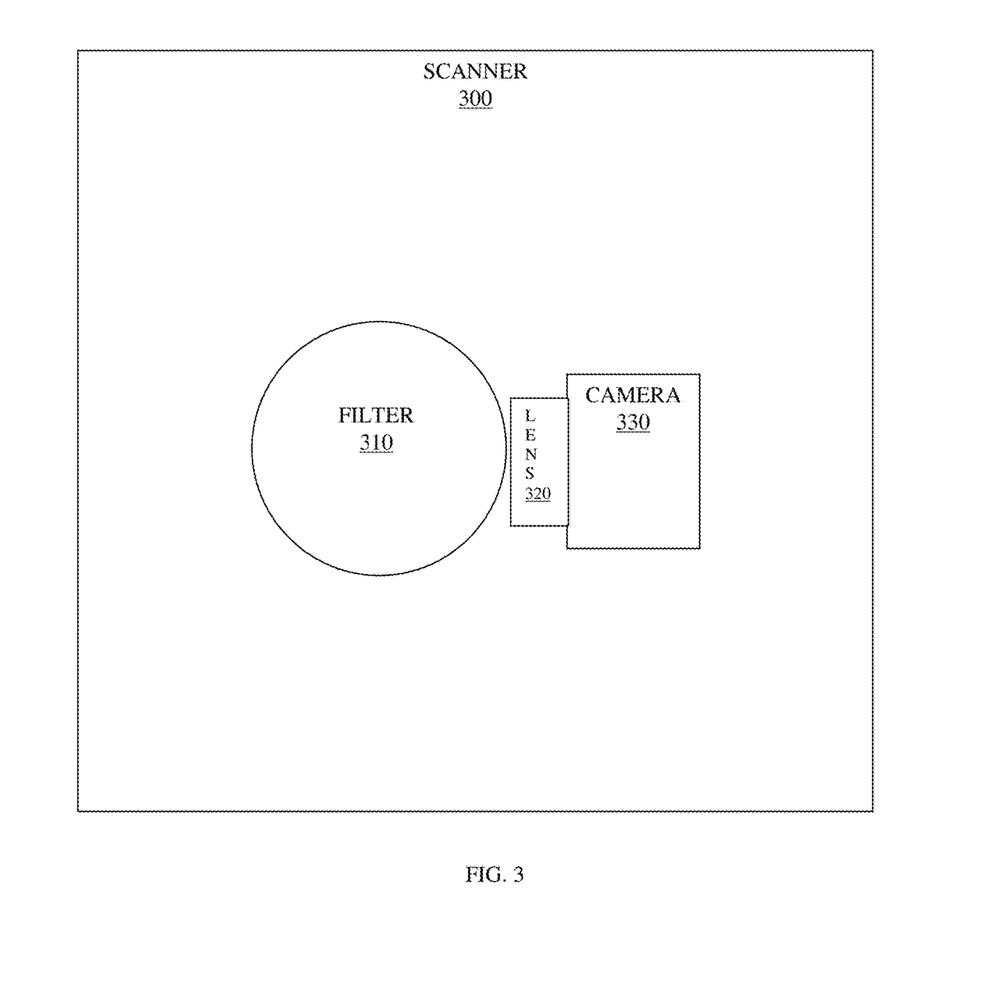
FIG. 3 is a diagram of a camera with lens for watermarked scanning, according to an example embodiment.

FIG. 3 is a diagram of a scanner 300 with lens for watermarked scanning, according to an example embodiment.

In an embodiment, the scanner 300 is the scanner camera 101 of the FIG. 1A.

In an embodiment, the scanner 300 is a monochrome scanner camera.

In an embodiment, the filter 310 is a long pass filter.

In an embodiment, the filter 310 filters light transmitting above approximately 500 nanometers.

In an embodiment, the filter 310 filters light transmitting above approximately 590 nanometers.

In an embodiment, the filter 310 is the filter 102 of the FIG. 1A.

In an embodiment, the filter 310 is the filter 112 of the FIG. 1B.

In an embodiment, the filter 310 is a Digimarc® enabled watermark filter for permitting the scanner 300 to image just Digimarc® watermarked wavelengths.

The scanner 300 includes a filter 310, a lens 320, and a camera 330.

The camera 330 is configured to image at least one side of the product based on reflected light filtered by the filter 310 and passed through the lens 320. The reflected light represents a wavelength associated with reflected light for a watermark integrated into packaging associated with the product.

In an embodiment, the watermark is integrated throughout the packaging such that any particular side imaged by the camera 300 captures just the reflected light of the watermark filtered through the filter 310 before passing through the lens.

In an embodiment, the camera 330 is a monochrome camera and the wavelength represents a specific non-monochrome color associated with the watermark.

In an embodiment, the filter 310 is a long pass filter adapted to one or more of: fit over the lens 320, situated in front of the lens 320, situated between the product for which the image is being taken and a mirror when the lens 320 of the camera 330 is directed to the mirror, situated inside an assembly for the lens, situated between the lens and an imaging sensor, and situated in front of a light source to filter 310 light before that light is reflected to the lens 320 of the camera 330.

In an embodiment, the filter 310 includes an adjustment setting that controls a desired amount of reflected light and blocked light into the imaging sensor of the camera 330.

In an embodiment, the wavelength is above, at, or about 590 nanometers.

In an embodiment, the wavelength is above, at, or about 500 nanometers.

In an embodiment, the scanner 300 is integrated into or interfaces as a peripheral device to a POS terminal.

Figure 4:
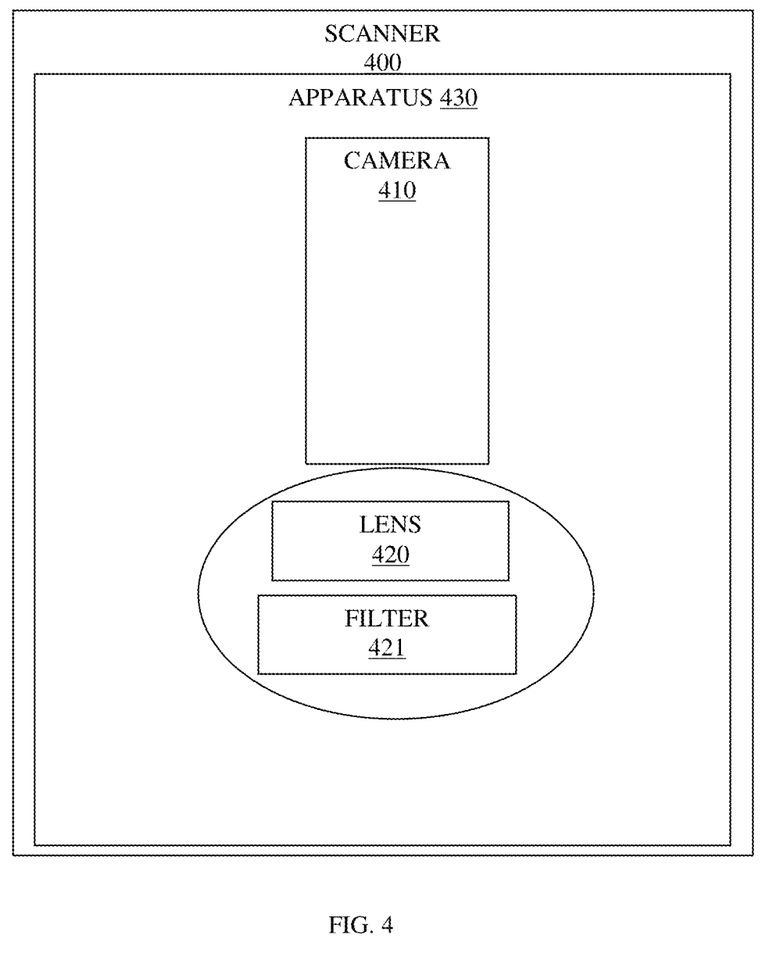
FIG. 4 is a diagram of camera and apparatus for watermarked scanning, according to an example embodiment.

FIG. 4 is a diagram of camera and apparatus 400 for watermarked scanning, according to an example embodiment.

In an embodiment, the scanner 400 is the scanner camera 101 of the FIG. 1A.

In an embodiment, the scanner 400 is a monochrome scanner camera.

In an embodiment, the filter 421 is a long pass filter.

In an embodiment, the filter 421 filters light transmitting above approximately 500 nanometers.

In an embodiment, the filter 421 filters light transmitting above approximately 590 nanometers.

In an embodiment, the filter 421 is the filter 102 of the FIG. 1A.

In an embodiment, the filter 421 is the filter 112 of the FIG. 1B.

In an embodiment, the filter 421 is a Digimarc® enabled watermark filter for permitting the scanner 400 to image just Digimarc® watermarked wavelengths.

The scanner 400 includes an apparatus 430 that includes a digital imaging camera 410, a lens 420, and a filter 421.

The filter 421 is situated over or covers the lens 420.

The imaging camera 410 is configured to capture an image through the filter 421 of the lens 420 of a watermark embedded or integrated into packaging of a product. The watermark reflects light when illuminated by a light source of the scanner 400 at a predefined wavelength.

In an embodiment, the filter 421 and lens 420 are packaged as a separate kit to be integrated with the imaging camera 410 of the scanner 400.

In an embodiment, the imaging camera 410 is a monochrome camera.

In an embodiment, the scanner 400 is integrated into or interfaced to (as a peripheral device) a POS terminal.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    placing a filter in front of an existing monochrome scanner camera that is integrated into a Point-Of-Sale (POS) terminal;
    receiving an image of a product being purchased by a customer during a checkout process at the POS terminal through the filter; and
    identifying a dot pattern of dots as a watermark from the image based on the filter for the image, associating the watermark with product information for the product, identifying the watermark as being multicolored on the package for the product, and identifying the watermark with the existing monochrome scanner camera retrofitted with the filter.

2. The method of claim 1, wherein receiving further includes receiving the image through a long pass filter that is the filter.

3. The method of claim 1, wherein receiving further includes receiving the image through the filter that captures reflected light from the product above about 500 nanometers in wavelength.

4. The method of claim 1, wherein receiving further includes receiving the image through the filter that captures reflected light from the product above about 590 nanometers in wavelength.

5. The method of claim 1, wherein receiving further includes receiving the image irrespective of any particular view or side of the product that is represented by the image.

6. The method of claim 1, wherein receiving further includes receiving the image through the filter that captures reflected light from the product associated with a wavelength of the watermark on the product.

7. The method of claim 1, wherein identifying further includes processing the image to identify encode information relevant to the product, wherein the encoded information represents a pattern for the watermark on the product.

8. The method of claim 7, wherein processing further includes identifying the encoded information as a Universal Product Code (UPC) for the product.

9. A scanner, comprising:
a filter;
a lens; and
a camera;
wherein the filter is situated in front of the lens, and wherein the camera is configured to image at least one side of a product based on reflected light filtered by the filter and passed through the lens after the filter, wherein the reflected light represents a wavelength associated with reflected light from a watermark integrated into packaging associated with the product, the watermark represented as a dot pattern of multi colored dots, and wherein the camera is an existing monochrome scanner camera that is retrofitted with the filter in front of the lens, and the camera is integrated into or interfaced to a Point-Of-Sale (POS) terminal, and wherein the scanner is a peripheral of the POS terminal to identify the dot pattern of the multi colored dots through the filter and to identify the product and product information for the product using the existing monochrome scanner camera with the filter.

10. The scanner of claim 9, where the wavelength represents a specific non-monochrome color associated with the watermark.

11. The scanner of claim 9, wherein the filter is a long pass filer adapted to one or more of:
fit over the lens, situated in front of the lens, situated between the product for which the image is being taken and a mirror when the lens of the camera is directed to the mirror, situated inside an assembly for the lens, situated between the lens and an imaging sensor, and situated in front of a light source to filter light before that light is reflected to the lens of the camera.

12. The scanner of claim 9, wherein the wavelength is above about 590 nanometers.

13. The scanner of claim 9, wherein the wavelength is above about 500 nanometers.

14. A scanner, comprising:
an apparatus comprising:
an imaging camera;
a lens of the imaging camera; and
a filter situated over and placed in front of the lens, wherein the imaging camera is configured to capture an image after passing through the filter that is in front of the lens, the image representing a watermark integrated in packaging of a product, wherein the watermark appearing on the packaging as a dot pattern of multi colored dots, wherein the watermark reflects light at predefined wavelength, wherein the imaging camera is an existing monochrome scanner camera that is retrofitted with the filter, and the imaging camera is integrated into or interfaced to a Point-Of-Sale (POS) terminal, and the scanner is a peripheral device of the POS terminal to identify the product through recognition of the dot pattern having the multi colored dots with the existing monochrome scanner camera retrofitted with the filter.

15. The scanner of claim 14, wherein the filter and lens are packaged as a separate kit to be integrated with the imaging camera of the scanner.

* * * * *